Feb. 6, 1940.   G. M. HEBBARD ET AL   2,188,899
RECOVERY OF DIOLEFINS FROM HYDROCARBON MIXTURES
Filed July 2, 1938   2 Sheets-Sheet 1

INVENTORS
George M. Hebbard
Lewis E. Lloyd
BY Griswold & Burdick
ATTORNEYS.

Feb. 6, 1940.  G. M. HEBBARD ET AL  2,188,899
RECOVERY OF DIOLEFINS FROM HYDROCARBON MIXTURES
Filed July 2, 1938  2 Sheets-Sheet 2

Patented Feb. 6, 1940

2,188,899

UNITED STATES PATENT OFFICE 2,188,899

RECOVERY OF DIOLEFINS FROM HYDROCARBON MIXTURES

George M. Hebbard and Lewis E. Lloyd, Midland, Mich., assignors to The Dow Chemical Company, Midland, Mich., a corporation of Michigan Application July 2, 1938, Serial No. 217,300

7 Claims. (Cl. 260—680)

The present invention relates to a process for recovering diolefins from hydrocarbon mixtures containing the same. More particularly it concerns an improved continuous process for separating butadiene from gaseous mixtures which also contain butylene.

It is known that both mono-olefins and diolefins will react with the salts of heavy metals of groups I and II of the periodic system to form complex addition compounds. When such reaction is carried out in an aqueous medium, the addition compound formed by the mono-olefin remains in solution, whereas that formed by the diolefin is substantially insoluble and precipitates. It is also known that this precipitated diolefin-metal salt addition compound may be decomposed by mild heating, the diolefin being thereby regenerated.

With these general principles as a basis, several processes for separating diolefins from hydrocarbon mixtures which also contain mono-olefins have been suggested in the prior art. The processes heretofore suggested are disadvantageous, however, in that a substantial proportion of the diolefin present in the hydrocarbon gases treated is not recovered, and the diolefin separated is not pure, its concentration rarely exceeding 90 per cent. Moreover, in many instances the heavy metal salt used for the separation cannot be satisfactorily recovered for re-use without expensive treatment. Further, the prior art processes make no provision for continuous operation. For these and other reasons, such processes are not well suited to the separation and purification of diolefins on an industrial scale.

An object of the present invention is to adapt and extend the general principles of the method mentioned above to provide a satisfactory commercial process for separating diolefins from hydrocarbon mixtures which also contain monoolefins. Another object is to devise a method wherein the diolefins are recovered in good yield and in a high state of purity, and wherein the heavy metal salts employed may be used repeatedly. Still another object is to provide a continuous process for separating butadiene from butylenes. Other objects will be apparent from the following description.

According to the present invention, a hydrocarbon mixture containing both mono-olefins and diolefins, e. g., a mixture of gases derived from cracking petroleum fractions, is contacted with an aqueous solution comprising a salt of a heavy metal of groups I and II of the periodic system, e. g., cuprous chloride, suitably at a temperature below about 15° C. The diolefin present substantially all reacts to form an insoluble diolefin-metal salt addition compound, whereas the mono-olefin, if it reacts at all, forms only products soluble in the aqueous medium. The insoluble diolefin-complex is then separated from the liquid reaction mixture, and the solution thus clarified is heated for a short time to remove any mono-olefin present therein, either dissolved per se or in the form of a mono-olefin-metal salt addition compound. This heated solution is then mixed with the insoluble diolefin-complex previously separated to form a slurry, which is then heated to regenerate the diolefin in substantially pure form and to redissolve the metal salt. The solution remaining after the regeneration is ready for re-use in the process.

In the accompanying drawings, which serve to illustrate and explain the invention:

Figure 1:
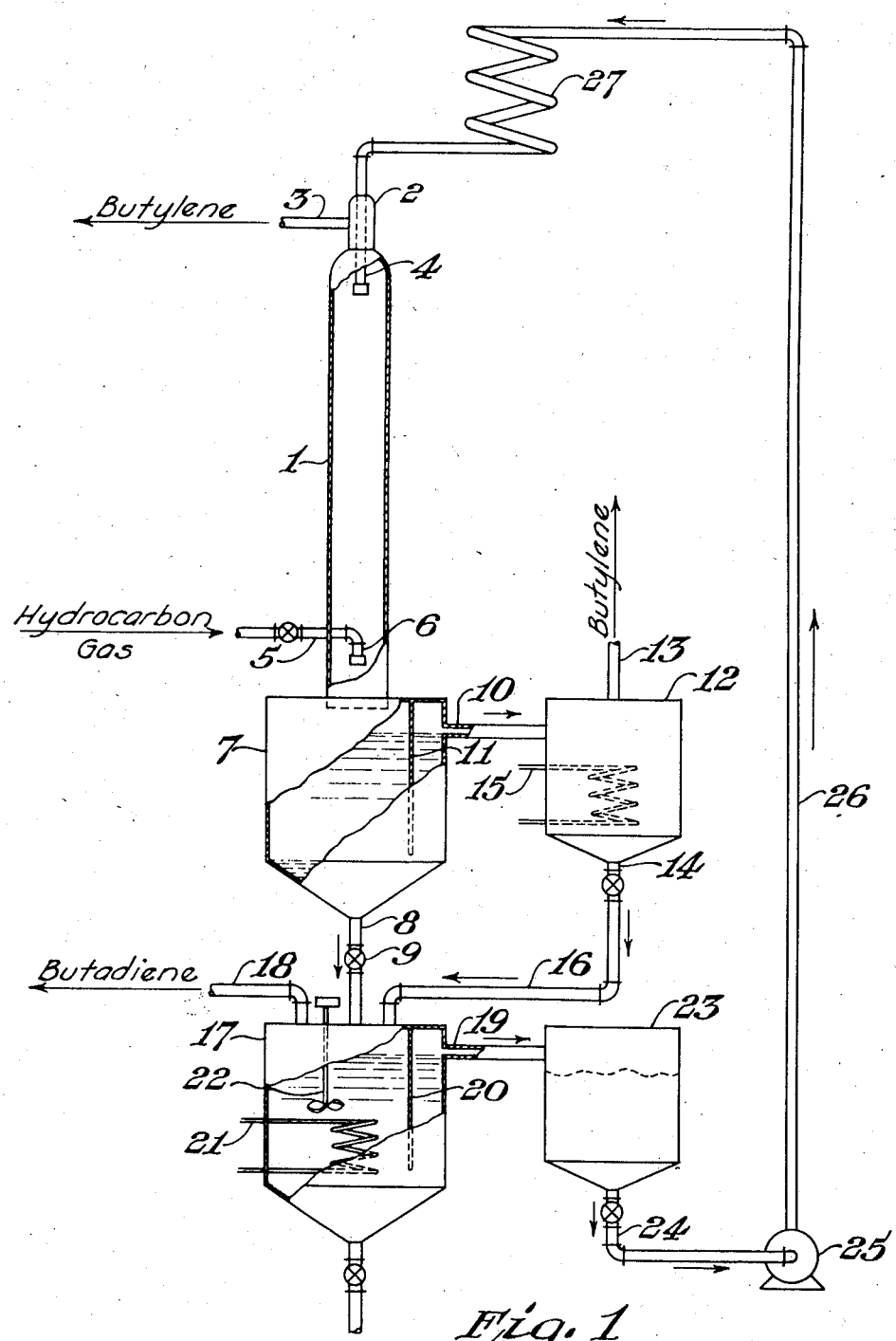
Fig. 1 is a diagrammatic representation of apparatus adapted to carrying out the process of our invention, showing the flow of materials therein.

Without intent to limit the invention, but for purpose of illustration, the process will be described with respect to the continuous separation and purification of butadiene from a gaseous hydrocarbon mixture which also contains butylene, using an aqueous solution of cuprous chloride and ammonium chloride as the absorbing solution. Referring to Fig. 1, the hydrocarbon mixture is contacted with the absorbing solution in a reaction tower 1, terminating at its upper end in a header 2, having a gas outlet 3. The absorbing solution is introduced at the top of the tower through a spray nozzle 4, and the gas to be treated is admitted in the bottom of the tower through an inlet 5 and a nozzle 6. At its lower end the reaction tower communicates with a separating tank 7, having a bottom outlet 8 controlled by a valve 9, an overflow 10 near the top, and a baffle 11 near the overflow outlet. The overflow pipe 10 leads to a closed heater 12 having a gas vent 13 at the top, a valved bottom outlet 14, and a heating coil 15 through which water or steam may be circulated. The bottom outlet 14 is connected by way of a line 16 with the regenerator 17. Likewise, the bottom outlet 8 of the separating tank 7 is connected to the regenerator through the valved line 9. The regenerator 17 has a gas outlet 18 in the top, an overflow pipe 19 near the top, and a baffle 20 near the overflow pipe, and contains a heating coil 21 and a stirrer 22. The overflow pipe 19 connects the regenerator with a storage tank 23. The regenerated solution in the storage tank 23 may be withdrawn through a valve-controlled outlet 24 and delivered by a pump 25 through a line 26 and a cooling coil 27 to the spray nozzle 4 in the top of the reaction tower 1.

In recovering butadiene from hydrocarbon gases using the apparatus shown in Fig. 1, the gases admitted at inlet 6 flow upwardly through the tower 1 countercurrent to a descending stream of the cooled reaction liquor issuing from the nozzle 4. During the contact practically all of the butadiene and at least a portion of the butylene present in the gas react with the cuprous chloride in the descending solution and are absorbed. The butadiene forms an insoluble addition compound which settles to the bottom of separator 7, but the portion of the butylene which reacts forms a soluble double compound which remains in solution. The inert gases in the mixture being treated and any butylene not reacted during contact with the solution escape from the reaction tower through the outlet 3 and may be collected and treated to recover the butylene in substantially pure form.

From time to time during operation the outlet valve 9 in the separator 7 is opened, allowing the insoluble precipitate which has collected to run into the regenerator. If desired, the valve 9 may be adjusted to permit a continuous flow of the heavy slurry. At the same time, the solution in the separator 7, which contains the soluble butylene-cuprous chloride addition compound, overflows continually into the heater 12, where it is warmed to dissociate the butylene-complex and to drive practically all the butylene from the solution. This gas escapes through the vent 13 and may be collected and may be combined with the butylene issuing from the reaction tower at the upper outlet 3.

The solution thus freed from butylene flows from the heater 12 through the line 16 into the regenerator 17 wherein it serves as the medium within which the insoluble butadiene complex may be dissociated. The heated solution from line 16 and the heavy slurry from the separator 7 are mixed by the stirrer 22 to form a thin slurry and are heated to a temperature sufficient to dissociate the insoluble complex, butadiene and cuprous chloride being thus re-formed. The butadiene escapes through the outlet 18 and may be collected in a highly pure state, and the cuprous chloride passes into solution. The reaction liquor thus regenerated overflows continually through the outlet 19 into the storage tank 23, from which it may be returned through the cooler 27 to the reaction tower 1.

In carrying out the process just described, the absorbing solution employed may comprise any metal salt capable of forming an insoluble addition compound with diolefins but no insoluble compound with mono-olefins, particularly salts of the heavy metals of groups I and II of the periodic system and especially of such metals in their monovalent form. Thus, soluble cuprous, mercurous, and silver salts are suitable, a cuprous halide being preferred. The formation of insoluble diolefin-metal salt addition compound occurs most satisfactorily in an acid medium, e. g. in the pH range 1 to 5, and for this purpose mineral acids such as hydrochloric acid, or acid-buffering salts such as ammonium chloride may be added to the absorbing solution. Ammonium salts have the further advantage that they tend to increase the solubility of cuprous, mercurous, and silver salts. If the hydrocarbon gas being treated contains an appreciable quantity of oxygen, absorbing solutions which comprise oxidizable metal ions, e. g. solutions of cuprous salts, tend to deteriorate on prolonged use; such effect may be offset by dissolving a small amount of a reducing agent, e. g. stannous chloride, in the solution. The proportion of heavy metal salt in the reaction liquor is not critical, but because of the limited solubility of most such salts, it is customary to use a nearly saturated solution, or even a reaction slurry containing an excess of undissolved salt.

Figure 2:
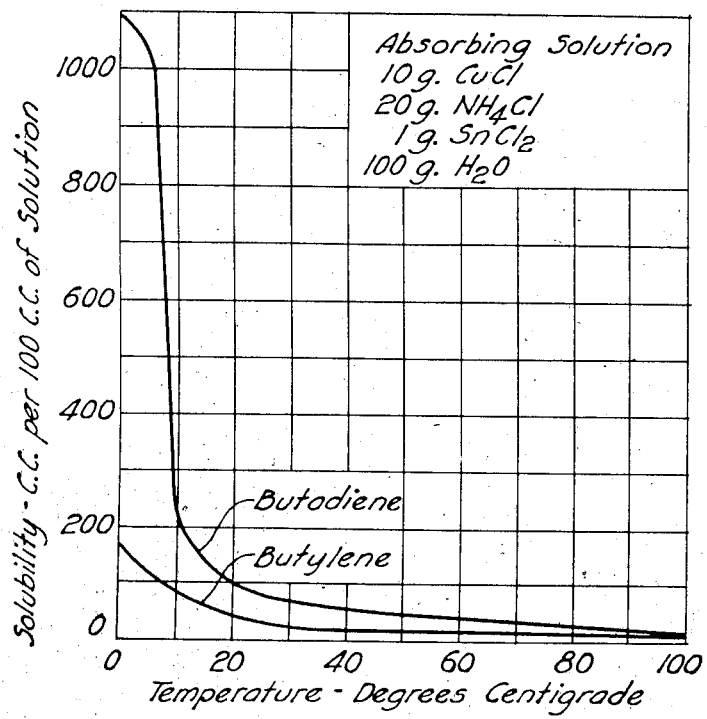
Fig. 2 is a graph showing the solubility of butadiene and of butylene in a cuprous chloride absorbing solution at various temperatures.

In the process, the formation of diolefin-addition compound is markedly increased and the efficiency of the separation is greatly enhanced by the use of low temperatures for the reaction occurring in the tower 1. This effect may be seen from Fig. 2, which shows that the solubility of diolefin in the absorbing solution, which is a measure of the formation of insoluble addition product, is very much greater at temperatures below about 15° C. than at higher temperatures. It is also apparent from Fig. 2 that at such low temperatures the ratio of the solubility of diolefin to that of mono-olefin is greatly increased. For these reasons, we prefer to operate at a reaction temperature below about 15° C., and preferably below 10° C., although some separation of diolefin may be achieved at higher temperatures.

As hereinbefore mentioned, the function of the heating step taking place in the heater 12 is to dissociate the soluble mono-olefin-metal salt addition compound and drive the mono-olefin from the absorbing solution. In our process this step is carried out after the insoluble diolefin-complex has been withdrawn, thereby insuring that the mono-olefin recovered is of high purity. It will be noted from Fig. 2 that the solubility of the mono-olefin in the reaction liquor is very low at any temperature above about 20° C. For this reason it is not essential in the heating step to raise the temperature of the liquor higher than about 20°–30° C. As a matter of heat economy, however, it is desirable to heat the solution to approximately the temperature to be employed in the subsequent regeneration step, e. g. 55°–65° C., and the use of this latter temperature in the heating step has the further advantage that the evolution of the mono-olefin occurs more rapidly.

Figure 3:
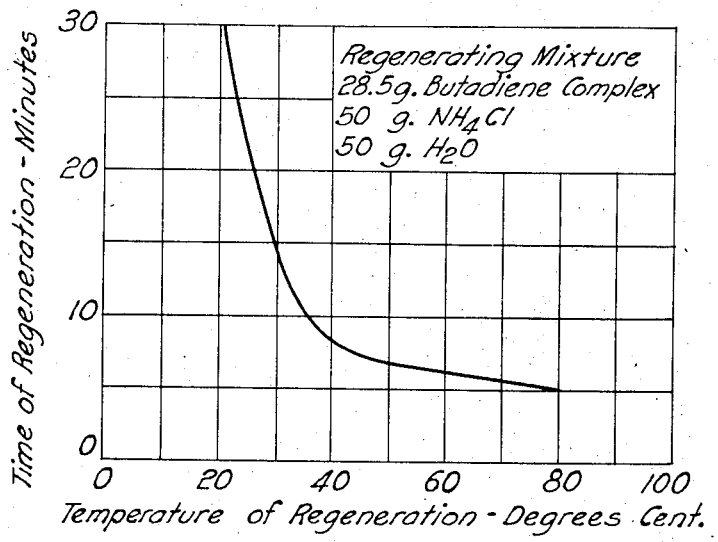
Fig. 3 is a graph showing the relative times required to regenerate butadiene from a butadiene-cuprous chloride addition compound at a number of different temperatures.

The dissociation of the diolefin-metal salt addition compound in the regenerator 17 may be carried out in a reasonable length of time at any temperature above about 30° C. For example, the relative times required at various temperatures to release butadiene from an addition compound with cuprous chloride are shown in Fig. 3. When regenerating such complex, we prefer to operate at about 55°–65° C., at which temperature dissociation is substantially complete in a few minutes.

It will be noted that in our process the diolefin-metal salt addition compound is decomposed in a medium from which the mono-olefins have already been expelled, so that the diolefin is recovered in a highly pure state. This procedure has the further advantage that the metal salt liberated dissolves readily in the liquor, and is thus ready for re-use without other treatment.

It will be understood that our process is adapted to the recovery not only of butadiene, but also of other diolefins from gases and vapors containing them, and is operable with gases containing these materials in a wide range of concentrations, and in the presence of inert diluents. Our process is not limited by the apparatus hereinbefore described, but may be carried out in any other apparatus capable of performing the same or equivalent steps. For instance, the hydrocarbon mixture need not be contacted with the reaction liquor in a spray tower, but the treatment may be conducted in any suitable vessel, either at atmospheric pressure or under such a pressure that the hydrocarbon mixture is liquefied.

The following example is illustrative of our invention, but is not to be construed as limiting the scope thereof:

*Example*

By operating continuously in accordance with the process hereinbefore disclosed, butadiene was recovered from a hydrocarbon gas derived from the pyrolysis of fuel oil and having the following approximate composition in parts by volume:

| | |
|---|---|
| Butadiene | 40 |
| Butylenes | 50 |
| Other unsaturates | 8 |
| Inert gases | 2 |

The reaction liquor employed was a solution containing 10 parts by weight of cuprous chloride, 20 parts of ammonium chloride, 1 part of stannous chloride, and 100 parts of water. The liquor was cooled to a temperature of —4° C. and circulated through the reaction tower at the rate of 2.4 gals. per hr., and the hydrocarbon gas was introduced at the rate of 2.3 cu. ft. per hr. The insoluble butadiene addition compound precipitated and was separated. The solution thus clarified was heated to a temperature of 60° C. and recombined with the insoluble addition compound, and the slurry thus formed was regenerated at a temperature of 60° C. Butadiene of 98 per cent purity was recovered at the rate of 0.9 cu. ft. per hr.

Other modes of applying the principle of our invention may be employed instead of the one explained, change being made as regards the details hereinbefore disclosed, provided the step or steps recited in any of the following claims, or the equivalent of such stated steps, be employed.

We therefore particularly point out and distinctly claim as our invention:

1. In a process for separating diolefins from a hydrocarbon mixture also containing mono-olefins, the steps which comprise contacting said mixture with an aqueous reaction liquor comprising a salt of a heavy metal of groups I and II of the periodic system, whereby an insoluble diolefin-metal salt addition compound is formed and a portion of the mono-olefin is dissolved in the liquor, separating said insoluble addition compound from the bulk of the reaction liquor, heating the reaction liquor thus clarified to drive off the mono-olefin, recombining said heated liquor with the separated diolefin-metal salt addition compound, further heating the slurry thus formed to dissociate said addition compound and liberate the diolefin, and recovering the diolefin.

2. In a process for separating diolefins from a hydrocarbon mixture also containing mono-olefins, the steps which comprise contacting said mixture with an aqueous reaction liquor comprising a salt of a heavy metal of groups I and II of the periodic system in monovalent form at a temperature below 15° C., whereby an insoluble diolefin-metal salt addition compound is formed and a portion of the mono-olefin is dissolved in the liquor, separating said insoluble addition compound from the bulk of the reaction liquor, heating the reaction liquor thus clarified to a temperature of at least 20° C. to drive off the mono-olefin, recombining said heated liquor with the separated diolefin-metal salt addition compound, further heating the slurry thus formed to a temperature of at least 30° C. to dissociate said addition compound and liberate the diolefin, and recovering the diolefin.

3. In a continuous process for separating diolefins from a hydrocarbon mixture also containing mono-olefins, the steps which comprise contacting said mixture with an aqueous reaction liquor comprising a cuprous halide at a temperature below 10° C., whereby an insoluble diolefin-cuprous halide addition compound is formed and a portion of the mono-olefin is dissolved in the liquor, separating said insoluble addition compound from the bulk of the reaction liquor, heating the reaction liquor thus clarified to a temperature of at least 30° C. to drive off the mono-olefin, recombining said heated liquor with the separated diolefin-cuprous halide addition compound, further heating the slurry thus formed to a temperature of at least 55° C. to dissociate said addition compound and liberate the diolefin, and recovering the diolefin.

4. In a continuous process for separating diolefins from a hydrocarbon mixture also containing mono-olefins, the steps which comprise contacting said mixture with an aqueous reaction liquor comprising a cuprous halide at a temperature below 10° C., whereby an insoluble diolefin-cuprous halide addition compound is formed and a portion of the mono-olefin is dissolved in the liquor, separating said insoluble addition compound from the bulk of the reaction liquor, heating the reaction liquor thus clarified to a temperature of at least 30° C. to drive off the mono-olefin, recombining said liquor with the separated cuprous-dihalide addition compound, further heating the slurry thus formed to a temperature of at least 55° C. to dissociate said addition compound, liberate the diolefin, and redissolve the cuprous halide, recovering the diolefin, and returning the reaction liquor to the first step.

5. In a process for separating butadiene from a hydrocarbon mixture also containing butylene, the steps which comprise contacting said mixture with an aqueous reaction liquor comprising a salt of a heavy metal of groups I and II of the periodic system, whereby an insoluble butadiene-metal salt addition compound is formed and a portion of the butylene is dissolved in the liquor, separating said insoluble addition compound from the bulk of the reaction liquor, heating the reaction liquor thus clarified to drive off the butylene, recombining said heated liquor with the separated butadiene-metal salt addition compound, further heating the slurry thus formed to dissociate said addition compound and liberate the butadiene, and recovering the butadiene.

6. In a continuous process for separating butadiene from a hydrocarbon mixture also containing butylene, the steps which comprise contacting said mixture with an aqueous reaction liquor comprising a cuprous halide at a temperature below 10° C., whereby an insoluble butadiene-cuprous halide addition compound is formed and a portion of the butylene is dissolved in the liquor, separating said insoluble addition compound from the bulk of the reaction liquor, heating the reaction liquor thus clarified to a temperature of at least 30° C. to drive off the butylene, recombining said heated liquor with the separated butadiene-cuprous halide addition compound, further heating the slurry thus formed to a temperature of at least 55° C. to dissociate said addition compound and liberate the butadiene, and recovering the butadiene.

7. In a process for separating butadiene from a hydrocarbon mixture also containing butylene, the steps which comprise contacting said mixture with an aqueous reaction liquor comprising cuprous chloride at a temperature below 10° C., whereby an insoluble butadiene-cuprous chloride addition compound is formed and a portion of the butylene is dissolved in the liquor, separating said insoluble addition compound from the bulk of the reaction liquor, heating the reaction liquor thus clarified to a temperature of between about 55° C. and about 65° C. to drive off the butylene, recombining said heated liquor with the separated butadiene-cuprous chloride addition compound, heating the slurry thus formed to a temperature between about 55° C. and about 65° C. to dissociate said addition compound, liberate the butadiene, and redissolve the cuprous chloride, recovering the butadiene, and returning the reaction liquor to the first step.

GEORGE M. HEBBARD.
LEWIS E. LLOYD.